(12) United States Patent
Tong (10) Patent No.: US 10,949,886 B2
(45) Date of Patent: Mar. 16, 2021

(54) SYSTEM AND METHOD FOR PROVIDING CONTENT TO A USER BASED ON A PREDICTED ROUTE IDENTIFIED FROM AUDIO OR IMAGES

(71) Applicant: Xevo Inc., Bellevue, WA (US)

(72) Inventor: Richard Chia Tsing Tong, Seattle, WA (US)

(73) Assignee: XEVO INC., Bellevue, WA (US)

( * ) Notice: Subject to any disclaimer, the term of this patent is extended or adjusted under 35 U.S.C. 154(b) by 84 days.

(21) Appl. No.: 16/351,192

(22) Filed: Mar. 12, 2019

(65) Prior Publication Data

US 2020/0294092 A1  Sep. 17, 2020

(51) Int. Cl.

| | | |
|---|---|---|
| G06K 9/00 | (2006.01) | |
| G06Q 30/02 | (2012.01) | |
| G06F 3/16 | (2006.01) | |
| G06K 9/62 | (2006.01) | |
| G01S 19/13 | (2010.01) | |
| B60K 37/06 | (2006.01) | |
| G06F 3/14 | (2006.01) | |
| G06F 3/01 | (2006.01) | |
| G10L 15/18 | (2013.01) | |
| G10L 15/22 | (2006.01) | |
| B60K 35/00 | (2006.01) | |

(52) U.S. Cl.
CPC .......... *G06Q 30/0266* (2013.01); *G01S 19/13* (2013.01); *G06F 3/16* (2013.01); *G06K 9/00832* (2013.01); *G06K 9/6201* (2013.01); *B60K 35/00* (2013.01); *B60K 37/06* (2013.01); *G06F 3/016* (2013.01); *G06F 3/14* (2013.01); *G06K 2209/01* (2013.01); *G10L 15/1815* (2013.01); *G10L 15/22* (2013.01)

(58) Field of Classification Search
CPC ............. G06K 9/00797; G06K 9/3246; G06K 9/2028; G06K 9/00832; B60R 1/00; G08G 1/054; G08G 1/04; G08G 1/0175; G08G 1/017; G06T 2207/10016; G06T 2207/30256; G06Q 30/0266
See application file for complete search history.

(56) References Cited

U.S. PATENT DOCUMENTS 5,243,528 A * 9/1993 Lefebvre .............. G01C 21/367
340/990
6,476,730 B2 * 11/2002 Kakinami .............. B60Q 9/005
340/435

(Continued)

*Primary Examiner* — Amir Alavi
(74) *Attorney, Agent, or Firm* — Seed IP Law Group LLP (57) ABSTRACT

Embodiments are directed towards providing a system that presents content to a user of a vehicle based on where the vehicle is going. A microphone captures audio signals within the vehicle, which are analyzed for route information. These audible commands may be said by a person in the vehicle, such as a passenger telling the driver where to turn, or they may be received from a mobile computing device, such as a smartphone executing a map application that is providing audible directions. An anticipated route of the vehicle is determined based on the audible route information. Content is selected and presented to the user of the vehicle based on the anticipated route. Images of a display screen of the mobile computing device may also be analyzed to identify the route information.

13 Claims, 7 Drawing Sheets

(56) References Cited

U.S. PATENT DOCUMENTS

| | | | | |
|---|---|---|---|---|
| 7,366,607 B2* | 4/2008 | Nakaishi | ............ | G01C 21/3629 |
| | | | | 701/431 |
| 7,710,291 B2* | 5/2010 | Kim | ........................ | G01S 15/86 |
| | | | | 340/995.1 |
| 8,305,234 B2* | 11/2012 | Tauchi | .................... | G08G 1/091 |
| | | | | 340/901 |
| 8,559,674 B2* | 10/2013 | Uchida | ...................... | B60R 1/00 |
| | | | | 382/106 |
| 8,660,734 B2* | 2/2014 | Zhu | ...................... | G05D 1/0214 |
| | | | | 701/23 |
| 9,395,191 B2* | 7/2016 | Aoki | ........................ | G01C 21/26 |
| 10,049,686 B1* | 8/2018 | Hera | .................... | G10L 21/0364 |
| 10,139,238 B2* | 11/2018 | Widmer | ................ | G01C 21/36 |
| 10,684,627 B2* | 6/2020 | Lavoie | ...................... | B60T 1/00 |
| 2008/0027641 A1* | 1/2008 | Fujiwara | ............ | G01C 21/3667 |
| | | | | 701/457 |
| 2020/0031337 A1* | 1/2020 | Soltanian | .......... | B60W 30/0956 |

\* cited by examiner

FIG. 6

SYSTEM AND METHOD FOR PROVIDING CONTENT TO A USER BASED ON A PREDICTED ROUTE IDENTIFIED FROM AUDIO OR IMAGES

TECHNICAL FIELD

The present disclosure relates generally to the dynamic, real-time selection and presentation of content to a person in a vehicle based on where the vehicle is expected to be traveling.

BACKGROUND

Description of the Related Art

Automobiles are becoming more and more user-friendly and interactive. Many new cars are now manufactured with a user interface, called a head unit, which a user can use to control various aspects of the automobile and access a variety of content or applications. For example, the user can use the head unit to change radio stations, change the temperature of the automobile cabin, access maps and global positioning systems, access the internet, access other head-unit applications, or access or control other accessories of the automobile. Even though head units offer multiple features to the user, the manufacturers of these devices are constantly striving to incorporate new features into them.

BRIEF SUMMARY

Embodiments are directed towards providing a system that presents content to a user of a vehicle based on where the vehicle is going. A microphone captures audio signals within the vehicle, which are analyzed for route information, e.g., "turn left at Main Street," "take next exit," etc. These audible commands may be said by a person in the vehicle, such as a passenger telling the driver where to turn, or they may be received from a mobile computing device, such as a smartphone executing a map application that is providing audible directions. An anticipated route of the vehicle is determined based on the audible route information. Content is selected and presented to the user of the vehicle based on the anticipated route. Images of a display screen of the mobile computing device may also be analyzed to identify the route information.

In this way, the head unit can obtain route information without the user specifically instructing the head unit to act (such as via a voice command). Moreover, this passive collection of data by the head unit can occur without formally coordinating the communication of route information from the mobile device to the head unit. Route information that is received or gathered without direct interaction with a user may be referred to as indirect route information. Indirect route information differs from conventional route information because there is no intent on the user's part to initiate some action via the head unit (or other computer) to present content related to navigation. As an example, a user may manifest this intent by announcing predetermined audio commands or directing other input actions, like touch-screen interactions, to the head unit.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator and is equivalent to the phrases "A or B, or both"

or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The term "user" is defined as a person or occupant that is in or otherwise being transported by a vehicle. The user may be the driver or a passenger of the vehicle. The term "vehicle" is defined as a device used to transport people or goods (or both), and examples include automobiles, buses, aircraft, boats, or trains. A "processor" is defined as a component with at least some circuitry or other hardware and that can execute instructions. The term "head unit" is defined as a component with at least some circuitry that is part of a vehicle and presents content to a user (as defined above). The term "present" is defined as to bring or introduce to the presence of a user through some sensory interaction. An "output interface" is defined as an interface including at least some circuitry that is configured to present content to a user. A "microphone" is defined as an instrument configured to convert sound waves into one or more corresponding electrical signals.

The term "content" is defined as information that can be presented to a user of the vehicle. Content may include visual content, audio content, tactile content, or some combination thereof. Visual content can include text, graphics, symbols, video, or other information that is displayed to a user. Audio content can include songs, vocals, music, chimes, or other types of sounds. Tactile content can include vibrations, pulses, or other types of touch-based sensations provided via a haptic interface. Generalized types of content can include advertisements, sports scores or information, logos, directions, restaurant menus, prices, hours of operation, coupons, descriptive information, emergency instructions, etc.

The term "route information" is defined as information related to a travel path (or route) or intended destination of a vehicle. The route information may be a single driving command or instruction, such as a left turn, or it may include a plurality of driving commands or instructions, such as turn right on Jones Avenue then turn left at Sunset Avenue and continue for 0.5 kilometers to arrive at your destination. The route information may include turning details, distances, a destination address, one or more mid-point addresses, street or road or highway identification information, or the like, or any combination thereof. Route information may be presented in audible or visual form. Audible route information may be any audio signal that can be captured by a microphone and used to identify an anticipated route of the vehicle. Visual route information may be any textual, graphical, or visible information on a display screen of a device that can be captured in an image from a camera and used to identify an anticipated route of the vehicle.

Figure 1:
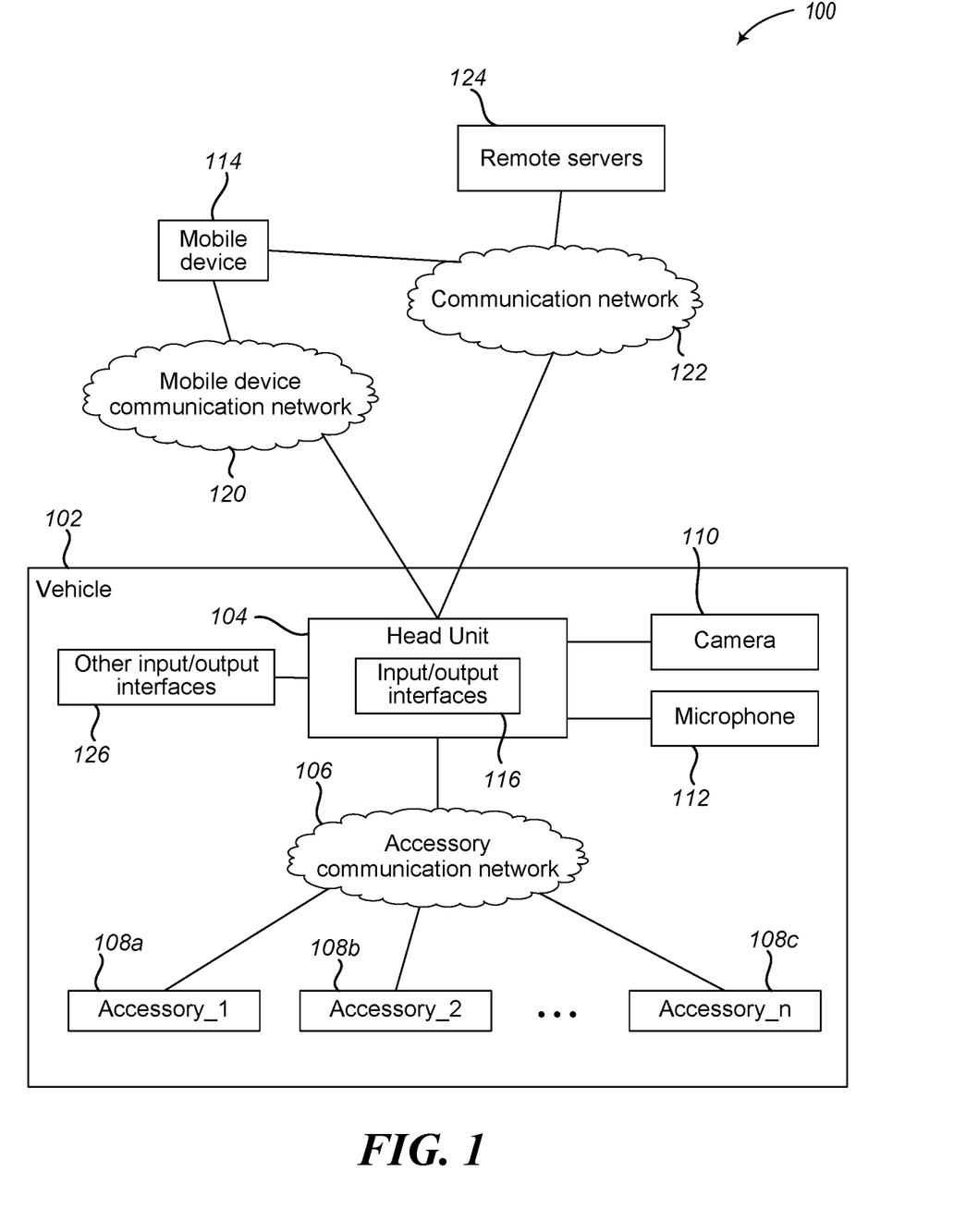
FIG. 1 illustrates a context diagram of a vehicle environment that utilizes audio or video input within the vehicle to identify audible or visual route information that is used to identify an anticipated route to provide content to that user in accordance with embodiments described herein.

FIG. 1 illustrates a context diagram of a vehicle environment that utilizes audio or video input within the vehicle to identify audible or visual route information that is used to identify an anticipated route to provide content to that user in accordance with embodiments described herein. System 100 includes a vehicle 102 that has a head unit 104 and one or more accessories 108a-108c. The vehicle 102 is virtually any means of transportation that includes a computing device and an output interface to provide content to a user of the vehicle 102. In the illustrative examples described herein, the computing device of the vehicle is the head unit 104, although other types of computing devices may be employed. Moreover, examples of vehicles include automobiles, aerial vehicles, water vessels, railroad vehicles, and other modes of transportation.

The head unit 104 is a computing device that presents content and other information to users of the vehicle and provides interactive controls and other user interfaces to them. In various embodiments, the head unit 104 utilizes one or more input/output interfaces for user interactions, which may be integrated into the head unit 104 (e.g., input/output interfaces 116) or external to the head unit 104 (e.g., other input/output interfaces 126). In some embodiments, the input/output interfaces 116 or a portion thereof may be part of or embedded within the head unit 104. In other embodiments, the other input/output interfaces 126 or a portion thereof may be separate from or independent of the head unit 104. In various embodiments, the head unit 104 may utilize some combination of the input/output interfaces 116 and the input/output interfaces 126. For example, the head unit 104 may include a built-in display device to output visual content and utilize a separate speaker that is external to the head unit 104 to output audio content. Any input/output interfaces 116 and input/output interfaces 126 may be collectively referred to as input/output interfaces 116, 126.

The input/output interfaces 116, 126 may be configured to receive input from a user of the vehicle 102 or to output content to a user of the vehicle 102 (or both). The input/output interfaces 116, 126 may include one or more output interfaces, which may include a visual interface, such as a display device; an audio output interface, such as a speaker; a haptic interface, such as a tactile output device; or a combination thereof. Therefore, the input/output interfaces 116, 126 may include one or more output interfaces configured to output visual content, audio content, tactile content, or some combination thereof. The input/output interfaces 116, 126 may also include one or more input interfaces, which may include physical or soft buttons, a touchscreen, a microphone, or other input interfaces. Therefore, the input/output interfaces 116, 126 may include one or more input interfaces configured to receive visual, audio, or physical input commands, or some combination thereof. Embodiments described herein may include the head unit 104 receiving input or providing output through an internal or integrated input/output interface 116 or other external input/output interfaces 126, or some combination thereof.

For ease of illustration, the vehicle 102 is also illustrated as having one or more cameras 110 and one or more microphones 112. As an example, the camera 110 is configured to capture images of an interior of the vehicle 102. In one arrangement, the camera 110 can be strategically positioned to focus on an area of the interior where a user may position or has previously positioned a mobile device 114. For example, a camera 110 may be part of or attached to a rearview mirror (not shown) or a dashboard (not shown) of the vehicle 102. If a user holds a mobile device 114 in a natural viewing position or places it in a cupholder or some other supporting space, the mobile device 114 may be within the field of vision of the camera 110. As such, images from the camera 110 may capture content being displayed by the mobile device 114, and they can be analyzed to determine if the mobile device 114 is displaying visual route information, such as a route highlighted on a map or a route defined by graphical or textual information. (Additional information on this process will be presented below.) In one embodiment, the position or focus of the camera 110 may be adjustable, whether manually or automatically (or both), One or more machine-learning ("ML") models may assist in determining the accuracy of the positioning or focus setting of the camera 110 in relation to detecting the content displayed by the mobile device 114, and adjustments can be automatically performed on either parameter (or both). As an alternative, a heuristic approach may be employed to adjust the camera 110.

The microphone 112 is configured to capture audio signals within the vehicle 102. As an example, the microphone 112 can be built into parts of the vehicle 102 likely to be within audible range of audio generated from interactions between the mobile device 114 and the user or conversations between the user and another person in or near the vehicle. As will be described in more detail below, the audio signals from the mobile device 114 can be analyzed to determine if a user in the vehicle is giving or receiving audible route information or other content, either in relation to the user's interaction with mobile device 114 or a person. In either the case of the camera 110 or the microphone 112, a mobile device 114 is not the only device capable of serving as a source of the collected data, as any machine with which the user may interact can do so.

Although the camera 110 and microphone 112 are illustrated as being separate from the head unit 104 and the other input/output interfaces 126, embodiments are not so limited. Rather, in some embodiments, one or both of the camera 110 or the microphone 112 may be integrated into the input/output interfaces 116 on the head unit 104 or into the other input/output interfaces 126. Moreover, although the vehicle 102 is shown as having both the camera 110 and the microphone 112, embodiments are not so limited. In some embodiments, the vehicle 102 may include the camera 110 but not microphone 112, although in other embodiments, the vehicle 102 may include the microphone 112 but not camera 110.

As an illustrative example, assume there are a driver and one other passenger in the vehicle 102. As the driver is driving the vehicle 102 down a road, the passenger may start to give the driver verbal instructions on which way to drive and where to turn. These verbal instructions may be referred to as audible route information. In this instance, the driver has not input a destination into the head unit 104, so the head unit 104 has not generated a travel route for the vehicle 102 and thus cannot present content associated with the route to the driver or passenger. But it may be beneficial for the head unit 104 to provide content related to the audible route information, such as a route to the destination or alternate routes, traffic information, driving reminders, advertisements for stores or restaurants along the route, etc.

Accordingly, the microphone 112 captures the audio signals of the verbal instructions said by the passenger and provides them to the head unit 104. The head unit 104 relies on various speech-recognition techniques to convert the captured audio signals into textual form. Natural-language-processing algorithms can then process the text to identify the intent and recognize the context of the audible route information. From this procedure, the head unit 104 can then retrieve data related to the audible route information, such as an anticipated route or destination of the vehicle 102, and present this content to the driver.

In this example, head unit 104 may be programmed with the speech-recognition and natural-language-processing algorithms, although some other computer that is part of the vehicle 102 may be responsible for such processing or share the task with the head unit 104 (or some other computer). In addition, the speech recognition or natural-language processing (or both) may be performed by one or more computers, like the remote servers 124, that are part of a cloud-based center capable of exchanging communications with the vehicle 102.

In addition to the anticipated route, the head unit 104 can present other content to the driver or passenger of the vehicle 102. Such content can be audible content, visual content, tactile feedback, or a combination thereof and can be presented via one or more input/output interfaces 116, 126. For example, the head unit 104 can provide a vibration or audible tone to remind the driver to make a turn as instructed by the passenger. As another example, the head unit 104 can provide an advertisement for gas that is next to the exit where the passenger instructed the driver to leave the current freeway. In yet another example, the head unit 104 can access a database or third-party server, such as remote server 124, to determine if there is heavy traffic on the anticipated route and if so, select an alternate route to provide to the driver, such as via a graphical map displayed on the head unit 104.

In some other embodiments, the received verbal instructions may be utilized by the head unit 104 to alter a current route or anticipated route. If the user selects a route to a destination or if the head unit 104 identifies an anticipated route based on verbal instructions from a passenger, then the passenger can alter the route by recognizing and announcing additional verbal route information. For example, assuming the head unit 104 is displaying a route via Interstate 5, and the driver tells a passenger, "I think I am going to take Highway 18 instead." Alternatively, the passenger may say, "You should take Highway 18 because it is generally faster." The system can process the new audible route information, and the head unit 104 can present an updated route via Highway 18.

Although the examples above describe the head unit 104 as receiving verbal instructions from a passenger of the vehicle, the head unit 104 can also receive other types of audible route information. For example, the driver may have input a destination into a map application executing on mobile device 114, which produced a route from the vehicle's 102 current location to the destination. The map application may output, via an electronic speaker on the mobile device 114 or a speaker of the vehicle, audible instructions for the driver to follow the route produced by the map application. Again, the system can capture the audible signals produced by the electronic speaker and process them to enable the head unit 104 to present appropriate content to the driver or passenger of the vehicle 102.

In addition to the audible information, the map application executing on the mobile device 114 may display the route on a display screen of the mobile device 114. For example, the driver may have the mobile device 114 affixed to or supported by a holder that positions the mobile device 114 to be viewable by the driver. In this example, the camera 110 may be positioned within the vehicle 102 to capture images of the display screen of the mobile device 114.

The images can be analyzed to identify any route information being displayed. Such route information may include a highlighted route on a map, textual instructions (e.g., "turn left at Sunset Avenue"), text displayed on the map, graphical instructions (e.g., a left turn arrow), graphics (including icons or other symbols) displayed on the map, mileage information, or other information that can identify where the vehicle is traveling and the proposed route of travel, or some combination thereof. The system can rely on image-recognition algorithms to make predictions about the analyzed data, and similar to using the audible instructions, the head unit 104 can retrieve and present content corresponding to the identified visual objects, such as an anticipated route or destination of the vehicle 102. In addition to the anticipated route, the head unit 104 can present other content to the driver or passenger of the vehicle 102.

The head unit 104, another computer that is part of the vehicle 102, or the remote servers 124 (or any combination of these computers) may process the images from the camera 110. Moreover, data from other systems may supplement the predictions generated from the analysis of the images. For example, the audible route information, whether received from the mobile device 114 or an occupant of the vehicle 102, can be used to adjust the confidence factors of the identified objects (including text) or class labels, leading to certain candidates being dropped from consideration because they conflict with the supplemental audio data.

Similarly, current and historical positional coordinates from the GPS system of the vehicle 102 can be used to filter out certain items that may have been identified as possible candidates in the analyzed images. For example, if the system is aware of the current location of the vehicle 102 and outputs a class label or textual data that is inconsistent with the geography of that location, the system can ignore this output. As a more specific example, if the vehicle 102 is traveling in Texas and one of the outputs of the system predicts that text recognized from the map application of the mobile device 114 reads as "Lake Michigan," the system can correspondingly lower the corresponding confidence factor and ignore the prediction.

In various embodiments, the head unit 104 may be configured to communicate with other computing devices, such as mobile device 114 or remote server 124. For example, the head unit 104 may communicate with remote server 124 via communication network 122 to provide audio or image data to the remote server 124 for processing, as described herein, or to request content or other information, such as in response to the identification of a future route of the vehicle 102. Accordingly, in some embodiments, the remote server 124 may provide some of the functionality described herein. In various embodiments, the content may be provided to the mobile device 114 for presentation to a user of the mobile device. In at least one embodiment, the mobile device 114 may act as an intermediate device between the head unit 104 and the remote server 124, although the head unit 104 (or other computer) may be equipped with a long-range communications stack to exchange data with the remote server 124.

The remote server 124 is any computing device, such as a server, cloud resources, a smartphone or other mobile device, or other computing device, which is remote to the vehicle 102 and that can provide content or other information to the head unit 104 or the mobile device 114. Although the remote server 124 is illustrated as a single device, embodiments are not so limited. Rather, the remote server 124 may be one or more computer devices that perform functions.

The mobile device 114 includes any personal device capable of communicating with a head unit 104 (or other computer) of the vehicle 102 or remote server 124. The mobile device 114 is configured and structured to send and receive information, content, or controls to and from the head unit 104 (or another computer) or the remote server 124. Examples of the mobile device 114 include laptop computers, smartphones, tablet computers, wearable computing devices, other smart devices, or other handheld computing devices.

In some embodiments, the remote server 124, the head unit 104, and the mobile device 114 communicate with each other via a communication network 122. The communication network 122 is configured to couple various computing devices to transmit data from one or more devices to one or more other devices. Communication network 122 may include various wireless networks using various forms of communication technologies and topologies, such as cellular networks, mesh networks, or the like.

In various embodiments, the head unit 104 communicates with the mobile device 114 via a mobile device communication network 120. The mobile device communication network 120 is configured to couple the mobile device 114 with the head unit 104 (or another computer) to transmit content/data between the mobile device 114 and the head unit 104 (or other computer). The information communicated between devices may include current accessory status or data, vehicle status information, requests to access accessory data, requests to control or modify an accessory, video data, voice data, image data, text data, or other types of content, data, or information. The communication network 120 may include a variety of short-range wireless communication networks, such as personal area networks utilizing classic Bluetooth or Bluetooth Low Energy protocols, Wi-Fi, or USB or an IR optical network to enable communication between the mobile device 114 and the head unit 104. The communication network 120 may also be implemented using Internet connectivity over wide-area cellular networks (such as 4G and 5G networks).

In various embodiments, the user may interact with the head unit 104 via the mobile device 114 such that the mobile device 114 acts as a virtual head unit. In this way, user input provided to the head unit 104 may be received from the user via the mobile device 114 and transmitted from the mobile device 114 to the head unit 104 for processing by the head unit 104. Conversely, content to be presented to the user may be provided to the mobile device 114 from the head unit 104 and displayed or otherwise output to the user from the mobile device 114. In some other embodiments, the mobile device 114 may perform the functionality of head unit 104, or the mobile device 114 may project applications or other processes to the head unit 104.

The mobile device communication network 120, the communication network 122, and the accessory communication network 106 may be separate communication networks, as illustrated, or some of them may be the same communication network or share network components.

Although the mobile device 114 is described in some embodiments as being configured to communicate with the head unit 104, in some cases, the mobile device 114 may not provide a destination or route information to the head unit 104 via mobile device communication network 120 or via communication network 122. In these scenarios, as described herein, the head unit 104 obtains the route or destination information (i.e., driving direction commands) via audio commands captured from a passenger within the vehicle or audio or visual data generated by the mobile device 114.

The head unit 104 may also be configured to access or receive information or control use of the one or more accessories 108a-108c. The accessories 108a-108c can include virtually any vehicle utility or device that provides information or data to the user, including data received from core components of the vehicle 102 via the vehicle's Controller Area Network (CAN bus). Examples of these accessories include gas tank level gauge, speedometer, odometer, wiper activity, external temperature, oil pressure gauge, temperature gauge, tire pressure gauge, or other vehicle sensors that provide information to a user of the vehicle.

Accessories 108a-108c may also include applications executing on the head unit 104 that provide information to the user or have two-way interactions with the user. Examples of these accessories include navigation, audio and radio controls, television or music applications, environmental control applications, vehicle performance or maintenance applications, or other applications.

Accessories 108a-108c may also include information from other sources. For example, in some embodiments, the accessories 108a-108c may include "derived accessory data" from internal-facing cameras, external-facing cameras, or other input devices. Derived accessory data is information about an environment associated with the vehicle 102 that can provide additional details or aspects. For example, images from a camera on the vehicle 102 may be analyzed to determine which user is in the vehicle 102, which user is operating it, where the driver or other user is looking (e.g., whether they are talking to a passenger), whether there are pedestrians nearby, whether there are billboards or store signs next to the road or vehicle 102, etc.

In some embodiments, the accessories 108a-108c may also include any vehicle utility or device that is controllable by a user. Examples of these accessories include adjustable seats, sunroof, side mirrors, rear-view mirror, air conditioner, power windows, or other controllable features of the vehicle 102.

It should be noted that some accessories may only output data, some accessories may only receive signals to manipulate the accessory, and some accessories may input and output data. For example, a speedometer may only output the current speed of the vehicle; a power window may only receive signals to move the window up or down, but not return any information to the head unit; and the navigation system may receive signals for a destination and return a suggested travel route to the destination. It should be further noted that these examples are non-exhaustive, and other types of accessories may also be employed.

The head unit 104 can communicate with the accessories 108a-108c via an accessory communication network 106. The accessory communication network 106 is configured to couple the accessories 108a-108c with the head unit 104 to transmit content/data between the accessories 108a-108c and the head unit 104. The information communicated between devices may include current accessory status or data, accessory control data, video data, voice data, image data, text data, or other types of content, data, or information. The accessory communication network 106 may include or support one or more physical networks; one or more wireless communication networks; one or more application program interfaces; or one or more other networks capable of transmitting data from one accessory to another, from an accessory to the head unit 104, or from the head unit to an accessory; or some combination thereof depending on the types of accessories communicating with the head unit 104. For example, the accessory communication network 106 may include an automotive body communication network, such as a wired controller area network, short-range wireless communication network, such as personal area networks utilizing Bluetooth Low Energy protocols, or any other type of network.

In some other embodiments, the head unit 104 may act as an intermediate device that facilitates communication between the mobile device 114 and the accessories 108a-108c. In this way, the head unit 104 can act as a gateway between the mobile device 114 and the accessories 108a-108c to provide authentication and authorization for permitting or restricting the control of accessories 108a-108c and the transfer of accessory information, which can enable a user to access information from or control accessories 108a-108c via mobile device 114.

Figure 2A:
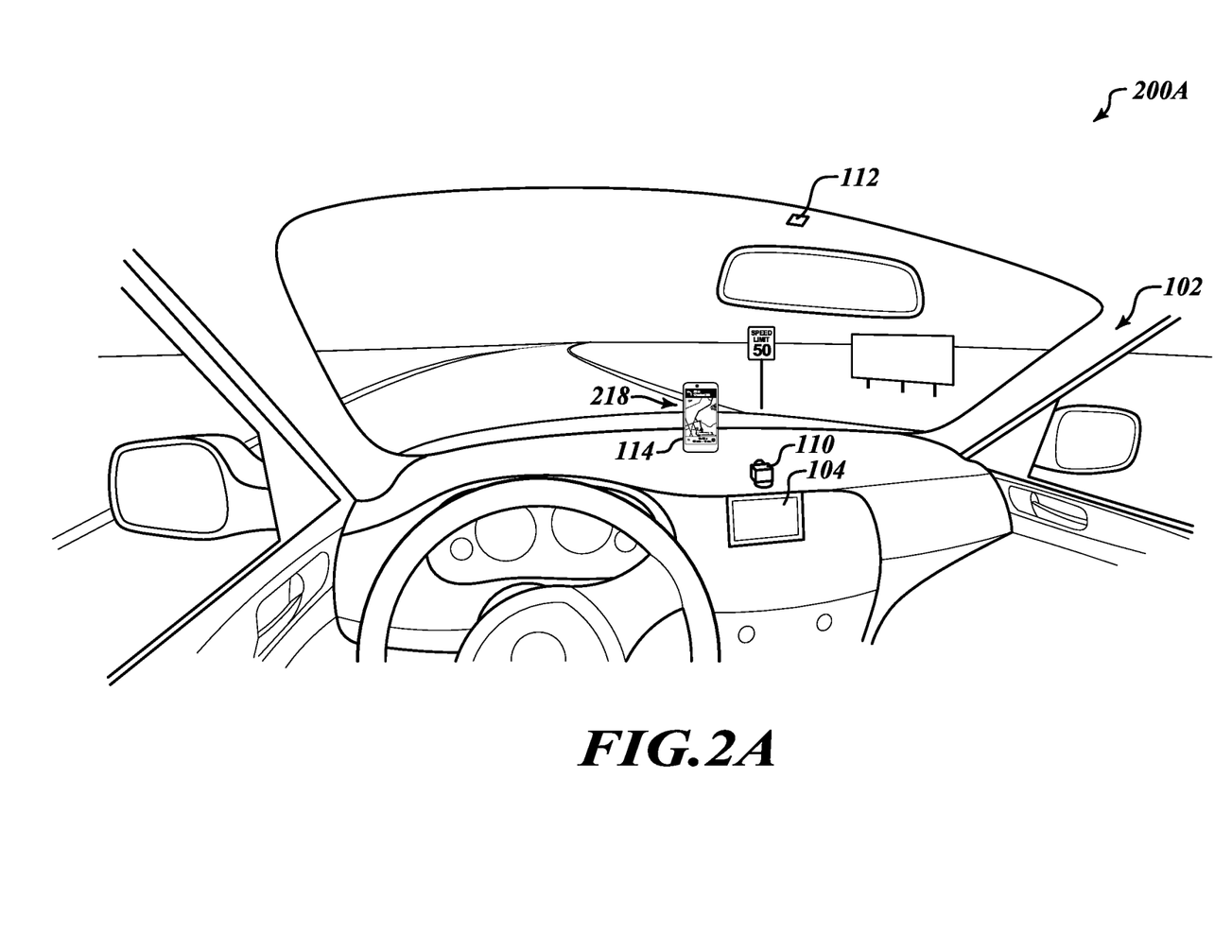
FIG. 2A shows a use case example of a view of an interior of a vehicle in accordance with embodiments described herein.
Figure 2B:
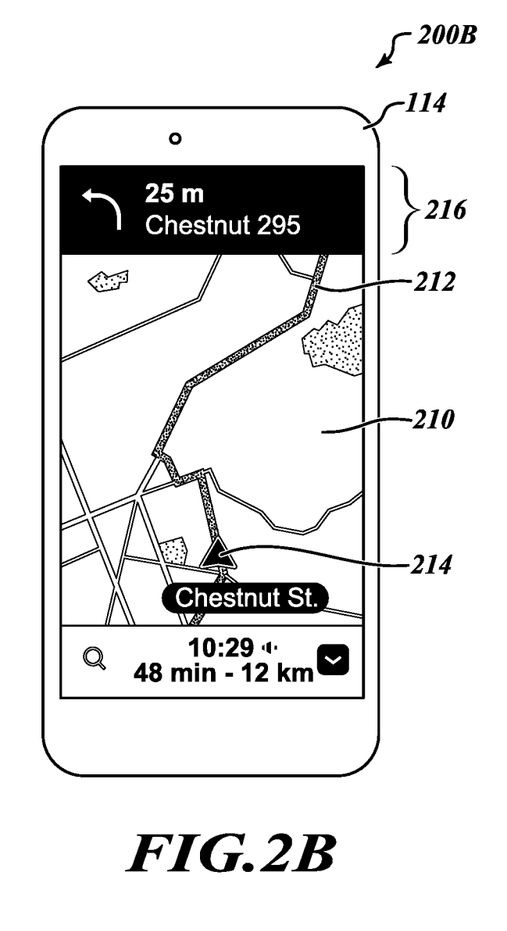
FIG. 2B shows a use case example of a view of a mobile computing device in accordance with embodiments described herein.

FIGS. 2A-2B show use case examples of various views of an interior of a vehicle and a mobile computing device in accordance with embodiments described herein. In particular, FIG. 2A shows a use case example 200A of a view of an interior of a vehicle 102 in accordance with embodiments described herein. Similar to what is described above, the vehicle 102 includes a head unit 104, a camera 110 and a microphone 112.

The microphone 112 is positioned and configured to capture audio signals from within an interior of the vehicle 102. As discussed elsewhere herein, the microphone is configured to capture audio signals of a passenger talking, audio output from the mobile device 114, or other audibly detectable information as the vehicle 102 is being operated. The audio signals are analyzed to identify audible route information, such as directions to make a turn; look for a particular street, store, or location; continue for a particular amount of time or a particular distance; or other route information. This route information can then be used to select and present content to a user in the vehicle, as described herein.

In this illustration, the microphone 112 is positioned on the front windshield above the rearview mirror inside the vehicle 102. In other embodiments, the microphone 112 may also be positioned elsewhere within the vehicle 102. For example, in some embodiments, the microphone 112 may be embedded in the head unit 104. In other embodiments, the microphone 112 may be positioned (not illustrated) in the steering wheel of the vehicle, at some other location on the dashboard of the vehicle 102, in a backseat area of the vehicle 102, etc. These example locations of where the microphone 112 may be positioned are for illustrative purposes and are not to be considered limiting. Rather, other locations within the vehicle 102 may also be utilized to house the microphone 112.

Although microphone 112 is illustrated as a single device, embodiments are not so limited. Rather, in some embodiments, the vehicle 102 may include a plurality of microphones 112 that are positioned at different locations throughout the interior of the vehicle 102. In this way, each microphone may be configured to capture audio signals from a different area or passenger within the vehicle 102, or they may be configured to jointly collect the audio signals independent of where they originate.

As an example, the camera 110 is positioned inside the vehicle 102 to capture images of a display screen of the mobile device 114. In various situations, the mobile device 114 may be positioned in a variety of different locations throughout the interior of the vehicle 102. However, if a user of the mobile device 114 is using the mobile device 114 to provide maps or route information to the user, then the mobile device 114 is probably positioned within the vehicle 102 so that the user can see a display screen of the mobile device 114. Accordingly, the camera 110 is positioned within the vehicle 102 to capture images of a display screen of the mobile device 114.

In example 200A, the mobile device 114 is illustrated as being positioned on the dashboard of the vehicle 102 such that the driver (not illustrated) can see the display screen of the mobile device 114. Thus, the camera 110 is positioned above the head unit 104 such that it can capture images of the mobile device 114. In another embodiment, the camera 110 may be positioned (not illustrated) in the roof of the vehicle 102 to provide a wider viewing angle of the interior of the vehicle. In yet another embodiment, the camera 110 may be positioned (not illustrated) near a back window of the vehicle 102 to capture images of the mobile device 114 when the mobile device 114 is being held by a passenger in a back seat of the vehicle 102. These locations of the camera 110 and mobile device 114 are for illustrative purposes and are not to be considered limiting; rather, other locations within the vehicle 102 may also be utilized to house the camera 110. Although not illustrated, in some embodiments, the vehicle 102 may include multiple cameras 110 to capture images of the mobile device 114 from different angles or of different areas within the vehicle 102.

In this example, as the vehicle 102 is being operated, the camera 110 is capturing images of the mobile device 114. The images from the camera 110 are analyzed to determine if visual route information is presently being displayed on the mobile device 114. This visual route information may include a map, textual information, graphical information, or other identifiers of where the vehicle is expected to travel. This route information can then be used to select and present content to a user in the vehicle, as described herein. An example image of a mobile device 114 captured from the camera 110 is shown in FIG. 2B.

FIG. 2B shows a use case example of a view of a mobile computing device in accordance with embodiments described herein. In particular, FIG. 2B illustrates an example image 200B of a display screen 218 of a mobile device 114, such as one captured by camera 110 in FIG. 1 or 2A. In this example, the display screen 218 is displaying a map 210. The map 210 includes a position icon 214 and a route 212. The position icon 214 illustrates the current location of the mobile device 114 and thus the current location of the vehicle in which the mobile device 114 is located. And the route 212 represents the projected or estimate path of the vehicle.

In various situations, a user of the mobile device 114 may preselect a destination for the vehicle, such as an address, a store, a restaurant, a park, or some other location. The mobile device 114 (or a remote server with which the mobile device is communicating) selects a route 212 between the current location of the mobile device 114 and the selected destination. The mobile device 114 then augments the map 210 to include a graphical representation of the route 212, such as by highlighting or changing the roads or streets on which the vehicle should travel to reach the selected destination.

As described herein, the head unit 104 of the vehicle 102 can utilize this image of the display screen 218 to identify the route 212 without directly receiving from the mobile device 114 any data related to the route 212. In various embodiments, as explained above, image recognition techniques can identify the map 210 and related items being displayed on the display screen 218. Such image recognition techniques may identify street patterns, street (or city or building) names, points of interest ("POI"), or other displayed information In some other embodiments, other information 216 that is being displayed by the display screen 218 may be utilized to identify the route 212. For example, a turn arrow (such as the illustrated left turn arrow) along with a street name (such as "Chestnut 295") may indicate an upcoming turn and the street on which the turn is to take place. In various embodiments, the system can compare the current location of the vehicle 102 with the recognized street name and the turn arrow to determine the estimated route and where the vehicle is expected to travel. The other information 216 may also include a distance measurement (e.g., 25 m), which can be further utilized by itself or in combination with the other displayed information to identify where the turn is located with respect to the current location of the vehicle. In various embodiments, one or multiple different pieces of information displayed on the display screen 218 can be utilized to identify the route 212. Once the route 212 is identified, the head unit 104 can present content related to the route 212 to the user (e.g., the driver or passenger in the vehicle), as described herein.

The operation of certain aspects of the disclosure will now be described with respect to FIGS. 3-5. In at least one of various embodiments, processes 300, 400, and 500 described in conjunction with FIGS. 3-5, respectively, may be implemented by or executed on one or more computing devices, such as head unit 104. In some embodiments, at least some (including all) of the functionality described herein may be implemented by or executed on mobile device 114, another computer that is part of the vehicle 102, or remote server 124.

The processes 300, 400, and 500 are not necessarily limited to the chronological orders shown here and may be executed without adhering to all the steps described here or with steps that are beyond those in the diagrams. To be clear, processes 300, 400, and 500 are merely examples of flows that may be applicable to or adopt the principles described herein.

Figure 3:
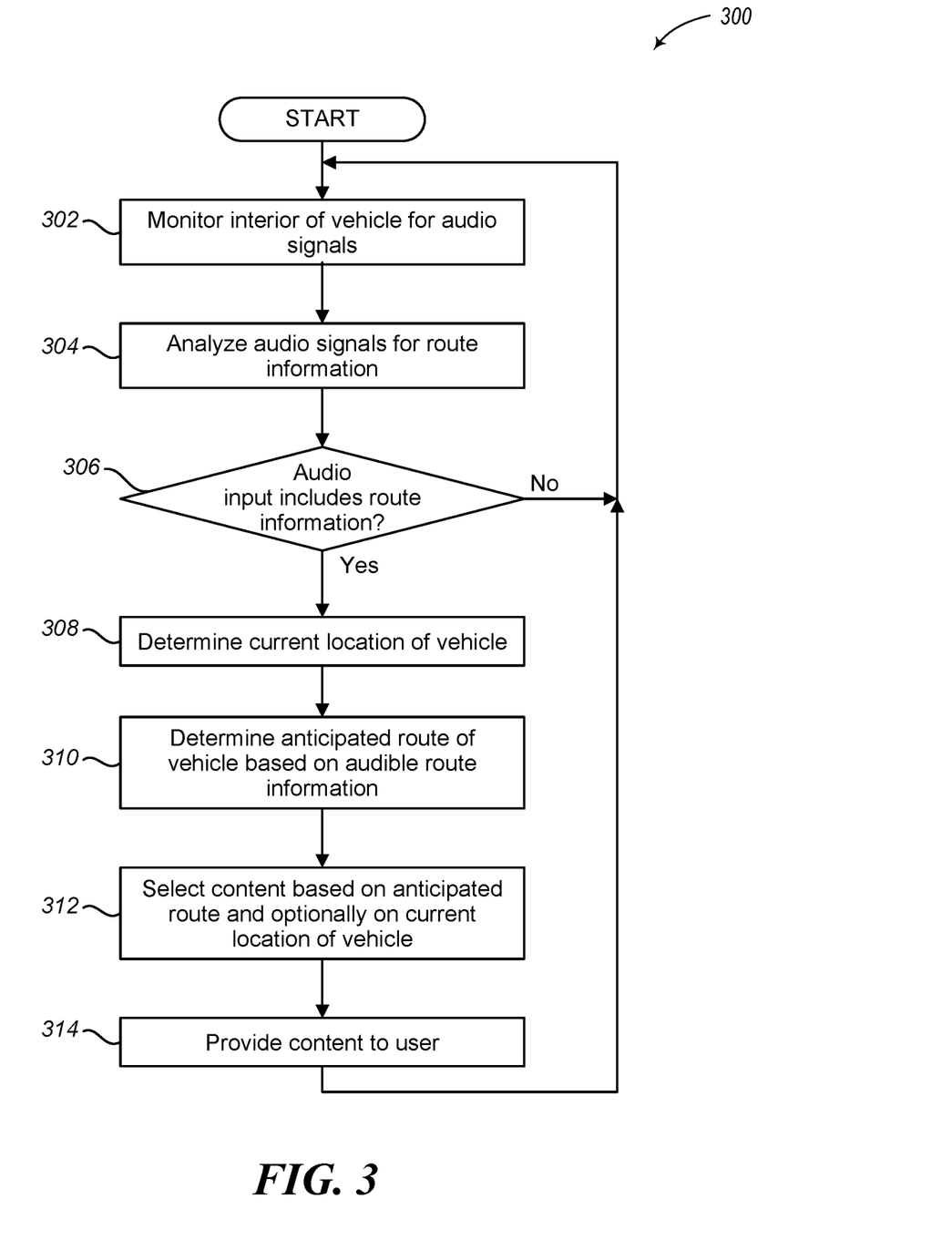
FIG. 3 illustrates a logical flow diagram generally showing one embodiment of a process for monitoring audible route information to select and provide content to a user in accordance with embodiments described herein.

FIG. 3 illustrates a logical flow diagram generally showing one embodiment of a process 300 for monitoring audible route information to select and provide content to a user in accordance with embodiments described herein. Process 300 begins, after a start block, at block 302, where an interior of a vehicle is monitored for audio signals. In various embodiments, one or more microphones are employed to capture audio signals from within an interior of or otherwise near the vehicle. In some embodiments, the audio signals may originate from an electronic speaker on a mobile device, such as when the mobile device is executing a map application that is outputting audible instructions or when the mobile device is in speakerphone mode with a person on the other end of the phone call providing directions or driving instructions. The audio signals may also be broadcast from a speaker that is part of the vehicle, such as if the mobile device is wirelessly coupled to the speaker. In other embodiments, the audio signals may originate from passengers within the vehicle, such as when a passenger is giving verbal driving directions or instructions to the driver.

In yet other embodiments, the audio signals may be collected prior to being output via an electronic speaker associated with the head unit. For example, assume a user is using the head unit to provide hands-free speakerphone capability. In this scenario, the mobile device of the user is utilizing a wireless communication protocol (e.g., Bluetooth) to send audio signal information of a phone call to the head unit. The head unit can then output the phone call via the vehicle's speaker system. In this embodiment, the information received from the mobile device via the wireless communication protocol is analyzed prior to being output via the speaker system of the vehicle.

Process 300 proceeds to block 304, where received audio signals are analyzed for route information. In various embodiments, one or more speech-recognition techniques are applied to the audio signals to convert them into textual form. In some embodiments, one or more audio filters may be employed to separate multiple voices being captured in the audio signals. Non-limiting examples of such filters may include pitch filters (e.g., to distinguish between male and female voices), or accent detectors (e.g., to distinguish between different dialects or pronunciations), etc. As another example, the system can be configured to recognize the speech of one or more users to help distinguish between speakers based on differences in the acoustic features of their voices.

Process 300 continues at decision block 306, where a determination is made whether the audio signals include route information. In some embodiments, natural-language-processing models process the converted text to identify keywords or phrases that are associated with different types of route information. Examples of such keywords or phrases may include "turn," "continue for," "next to," "exit," "your destination is ahead," "follow the signs," etc. One or more different keywords or phrases may be associated with one or more separate pieces of route information. In various embodiments, these keywords or phrases may be combined with names, times, distances, colors, addresses, or other descriptive information that, when combined, represents the route information.

If the audio signals include route information, process 300 flows to block 308; otherwise, process 300 loops to block 302 to continue to monitor the interior of the vehicle for audio signals.

At block 308, a current location of the vehicle is determined. In various embodiments, a GPS unit or other location-based tracking system may be employed to determine the current location of the vehicle.

Process 300 proceeds next to block 310, where an anticipated route of the vehicle is determined based on the route information. The anticipated route may be one or more streets, one or more turns, one or more GPS coordinates, an address, a physical location, a course or way of travel between two points, or any other information that defines where the vehicle may be travelling.

In various embodiments, one or more pieces of route information, along with the current location of the vehicle, are utilized to identify the anticipated route, such as via a mapping database query. For example, if the only route information is "turn left at Sunset Avenue," then the anticipated route may be calculated from a current location of the vehicle along the current road in which the vehicle is travelling (which may be determined based on continuous GPS monitoring compared with one or more mapping features) to an intersection with Sunset Avenue. Conversely, if the route information is "turn right on Jones Street, go about one kilometer, then turn left at the top of the hill," then each separate piece of route information is combined to determine a longer, more detailed anticipated route.

In other embodiments, the anticipated route may also include an additional anticipated route beyond the current route information. This additional anticipated route may be for a particular distance to a particular traffic feature or condition from the route information. For example, if the route information is "turn left at Sunset Avenue," then the anticipated route may include one additional kilometer or to a next intersection after the turn on Sunset Avenue.

In some embodiments, the anticipated route may also be selected from a database that stores previous destination or routes traveled by the vehicle, which is described in more detail below in conjunction with FIG. 5. For example, if the vehicle has stored multiple previous routes and each time the vehicle turns right on Jones Street it then turns left on Sunset Avenue, then the anticipated route can include the turn on Sunset Avenue, even if that information was not part of the route information.

In some other embodiments, the current location of the vehicle may not be used, and thus block 308 may be optional and may not be performed. For example, if the route information is "it's in the same parking lot as Restaurant_XYZ," then a database can be queried for the address of Restaurant_XYZ, which can be used as the anticipated route. If, however, the current location of the vehicle is obtained, then the anticipated route can include all streets and turns between the current location and Restaurant_XYZ.

Process 300 continues next at block 312, where content is selected based on the anticipated route. In various embodiments, a database stores content related to various locations, such as thoroughfares or other travel paths. The anticipated route is then compared to or queried against the database, and content associated with the anticipated route is then retrieved. The content that is retrieved may be based on any number of predetermined factors, such as historical activity related to the user or vehicle, associations with establishments maintained by the user, or data received from the accessories 108a-108c. For example, if the address of a store or restaurant is on the anticipated route or within a selected distance therefrom and the user has visited one of them recently, then an advertisement for that store or restaurant can be retrieved.

In another example, a traffic service may provide in real-time the locations of traffic accidents, heavy traffic, construction, poorly maintained roads, or other traffic conditions. If the anticipated route is through an area associated with poor traffic conditions (e.g., an accident), then the selected content may be data retrieved from this service, and an alternative route may be generated.

Process 300 proceeds to block 314, where the content is presented to a user (e.g., the driver or other passenger) of the vehicle. In various embodiments, the content is provided to the user via a display device, an audio output device, or a haptic interface.

As described herein, the content may be visual content, audio content, tactile content, or some combination thereof. For example, if the selected content is an advertisement, then the head unit may output an audible description of the restaurant, the hours of operation, or a current discount or sale. As another example, if the selected content includes an alternative route, then the head unit may display a navigation interface with a graphical image of the alternative route from the vehicle's current location.

After block 314, process 300 loops to block 302 to continue to monitor the interior of the vehicle for additional audio signals to identify additional route information. In various embodiments, the head unit may continuously monitor the vehicle for audio signals. In other embodiments, the head unit may monitor the vehicle for audio signals at selected intervals or for a selected period of time, or this feature may be voice activated. As an example, if the audio signals are analyzed and the user is listening to music, then the head unit may modify how often it monitors the vehicle for audio signals to be at a slower frequency (e.g., once every five minutes, rather than once every five seconds). But if the audio signals include route information, then the monitor rate may be increased or made continuous to capture successive pieces of route information. Speaker-recognition models can also be used to distinguish a user's voice from spoken words or singing originating from the vehicle's entertainment system.

In some other embodiments, the head unit may utilize previous route information to determine when to next monitor the vehicle for another piece of route information. For example, the previous route information indicates that the user is to drive straight for 30 minutes, then the head unit may wait for 25 minutes before it next monitors the vehicle for audio signals that may contain route information. These examples are for illustrative purposes, and other embodiments may employ other values.

Figure 4:
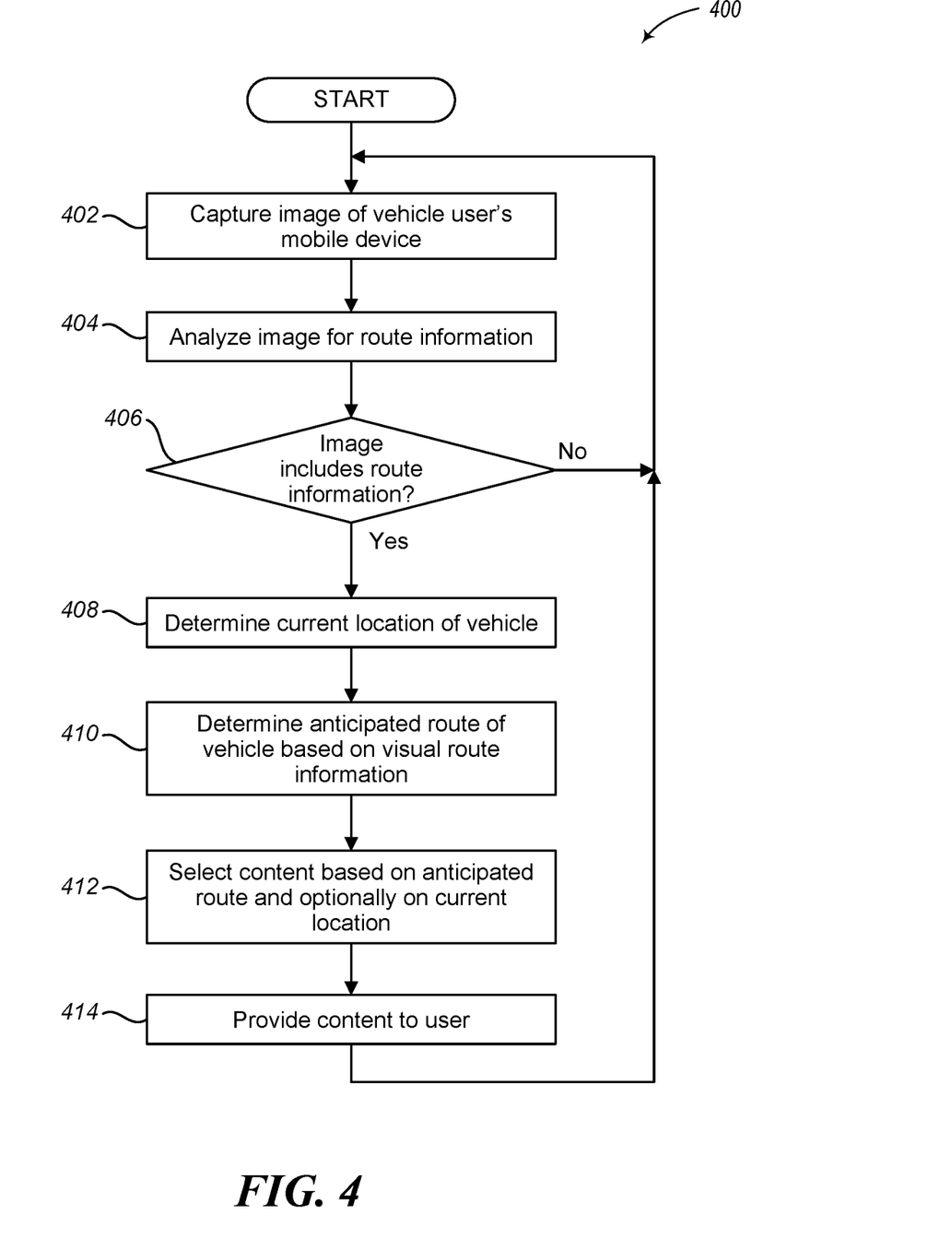
FIG. 4 illustrates a logical flow diagram generally showing one embodiment of a process for monitoring images of a display screen of a mobile computing device to identify visual route information to select and provide content to a user in accordance with embodiments described herein.

FIG. 4 illustrates a logical flow diagram generally showing one embodiment of a process 400 for monitoring images of a display screen of a mobile computing device to identify visual route information to select and present content to a user in accordance with embodiments described herein.

Process 400 begins, after a start block, at block 402, where one or more images of a display screen of a user's mobile device are captured. In some embodiments, image-recognition techniques may be performed to identify or determine if a mobile device display screen is visible in the captured images.

Process 400 proceeds to block 404, where the captured images are analyzed for route information. In various embodiments, one or more image recognition-techniques are applied to the images to identify maps, highlighted routes, words or phrases, graphics, icons, or other directions or driving instructions that are being displayed on the display screen of the mobile device.

Process 400 continues at decision block 406, where a determination is made whether the images include route information. In some embodiments, any identified words or phrases detected in the images are processed to identify keywords or phrases that are associated with different types of route information, similar to what is described above in conjunction with block 306 in FIG. 3 with respect to the audio route information. Similarly, various different graphics, icons, mapping information, etc., from the images may be processed to determine if the image includes visual route information. In the case of text, the symbols extracted from the images can be mapped against a database of known characters or abstract representations of the characters. In addition, adaptive-recognition techniques, which rely on features or characters identified with a high degree of confidence to recognize adjacent, unidentified features or characters, may be employed.

If the images include route information, process 400 flows to block 408; otherwise, process 400 loops to block 402 to continue to capture additional images of the display screen of the user's mobile device.

At block 408, a current location of the vehicle is determined. In various embodiments, block 408 may employ embodiments of block 308 in FIG. 3 to determine the current location of the vehicle.

Process 400 proceeds next to block 410, where an anticipated route of the vehicle is determined based on the route information. In various embodiments, block 410 may implement embodiments of block 310 in FIG. 3 to determine the anticipated route. For example, one or more mapping databases may be accessed and the route information queried to predict where the vehicle is headed. Previous travel history, including for the current trip or other excursions from the past, may also be considered.

Process 400 continues next at block 412, where content is selected based on the anticipated route. In various embodiments, block 412 may implement embodiments of block 312 in FIG. 3 to determine the anticipated route.

Process 400 proceeds to block 414, where the content is provided to a user of the vehicle. In various embodiments, block 414 may implement embodiments of block 314 in FIG. 3 to provide the selected content, to determine the current location of the vehicle.

After block 414, process 400 loops to block 302 to continue to capture images of the display screen of the user's mobile device. Similar to what is described above in conjunction with FIG. 3, process 400 may capture images at selected time periods or intervals or based on the route information itself.

Figure 5:
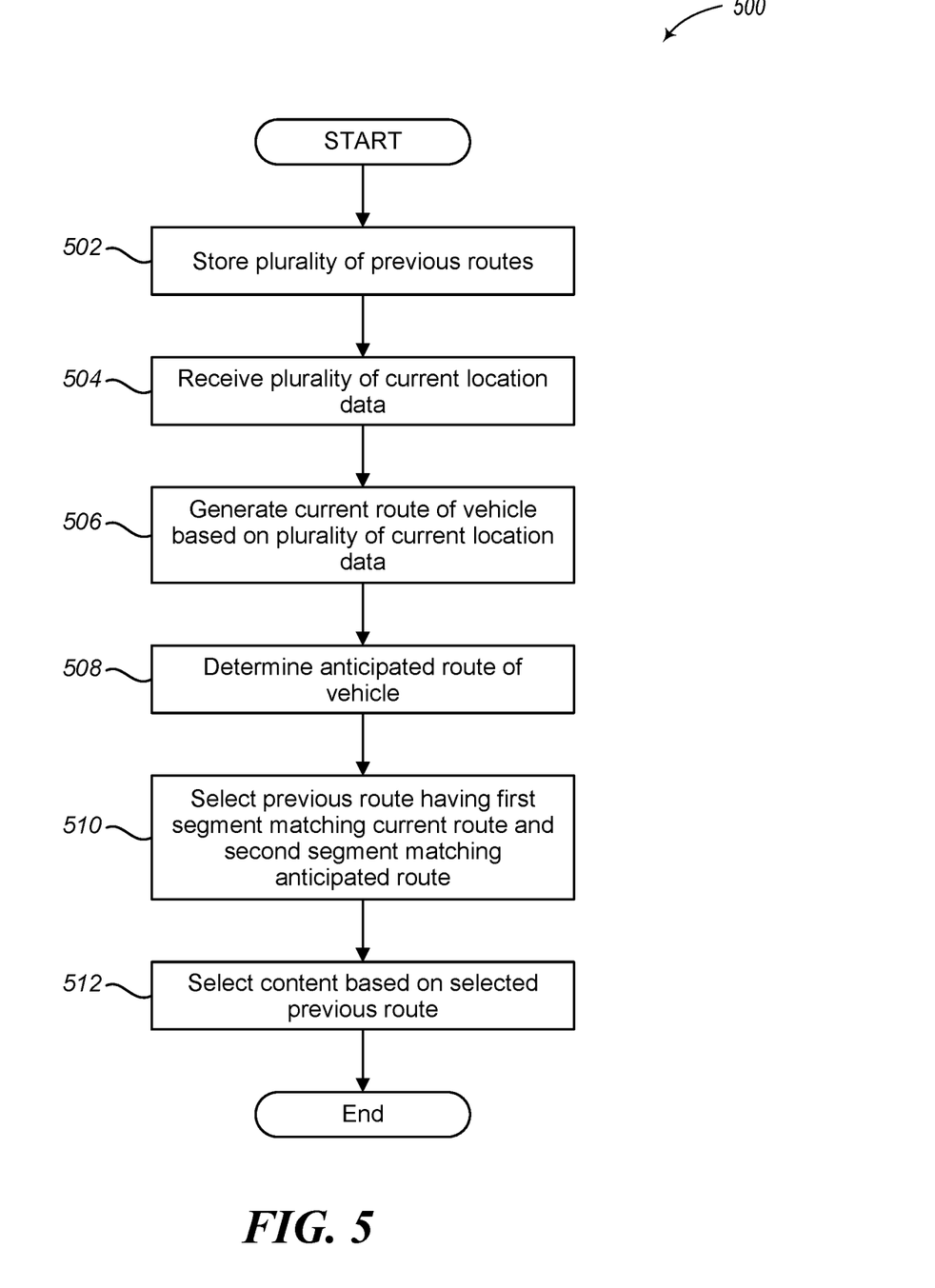
FIG. 5 illustrates a logical flow diagram generally showing one embodiment of a process for selecting a previous route based on a current route and an anticipated route to select and provide content to a user in accordance with embodiments described herein.

FIG. 5 illustrates a logical flow diagram generally showing one embodiment of a process 500 for selecting a previous route based on a current route and an anticipated route to select and provide content to a user in accordance with embodiments described herein.

Process 500 begins, after a start block, at block 502, where a plurality of previous routes are stored. In various embodiments, the routes may be stored as a plurality of physical location data points, as a plurality of turns, a series of street names, etc. The previous routes may have been selected or programmed by a user, or they may be determined based on historical travel patterns of the user or vehicle.

Process 500 proceeds to block 504, where a plurality of current location data for the vehicle is received. In some embodiments, the plurality of current location data is obtained by monitoring a GPS device or other location-based device, which may be for a predetermined amount of time, such as from when the vehicle was turned on. As such, the plurality of current location data may be a set of location data collected over the vehicle's present route or multiple routes over the course of some period.

Process 500 continues to block 506, where a current route of the vehicle is generated based on the plurality of current location data. In various embodiments, the plurality of current location data is compared to one another and to a map to generate the current route. As an example, the current location data identifies individual locations where the vehicle has previously been during the current operation of the vehicle, and the current route indicates a path in which the vehicle has previously traveled during its current operation.

Process 500 proceeds next to block 508, where an anticipated route of the vehicle is determined. In various embodiments, the anticipated route is determined from block 308 in FIG. 3 or block 408 in FIG. 4.

Process 500 continues next at block 510, where a previous route from the stored plurality of previous routes is selected based on a previous route having a first segment that matches the current route of the vehicle and a second segment that matches the anticipated route of the vehicle.

Process 500 then proceeds to block 512, where content is selected based on the selected previous route. In various embodiments, block 512 may implement embodiments of block 312 in FIG. 3 to select content to be provided to the user based on the previous route, rather than the anticipated route, as described in FIG. 3. As with earlier examples, process 500 may result in content being presented to the user without the user's direct interaction with the system.

Figure 6:
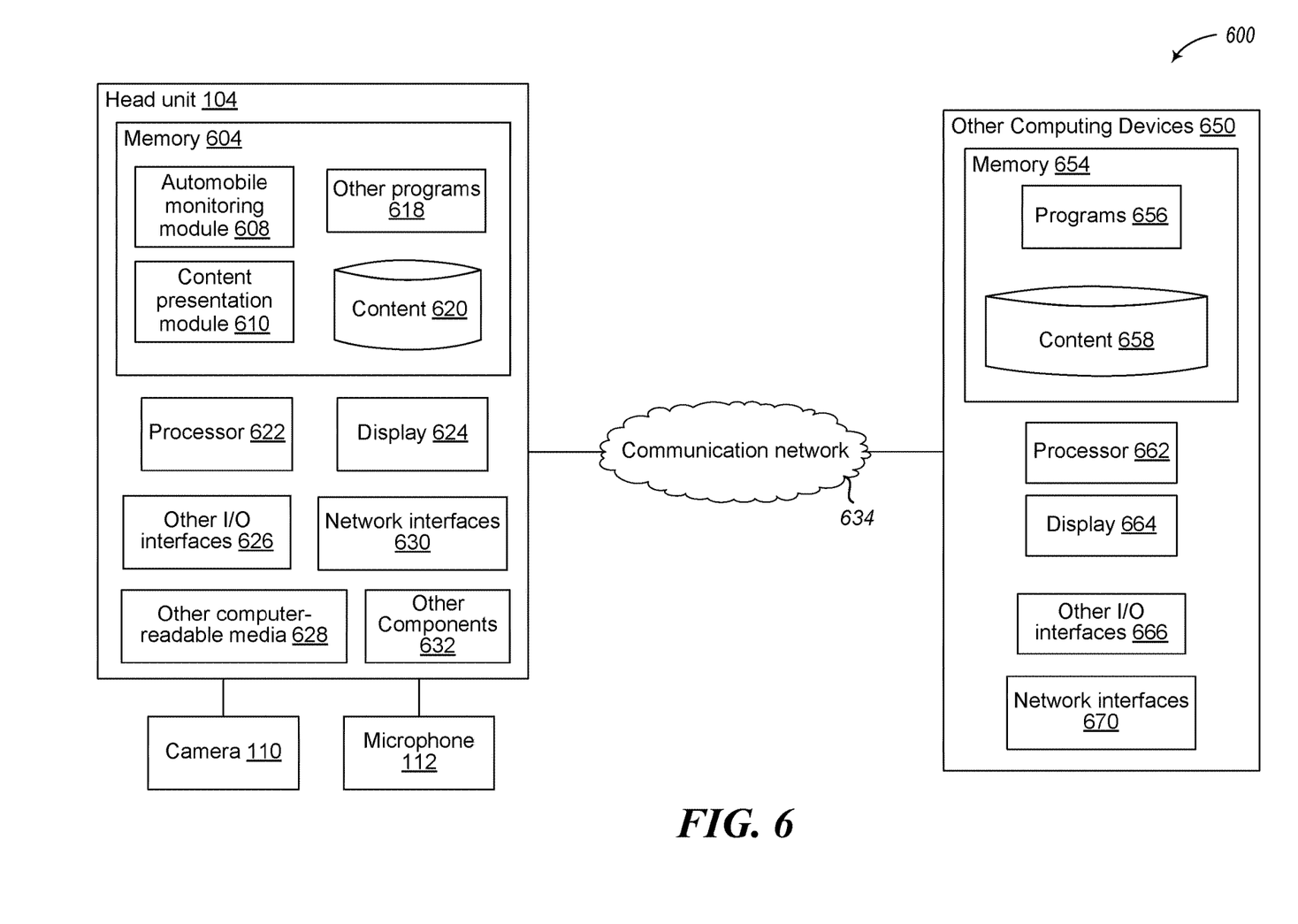
FIG. 6 shows a system diagram that describes one implementation of computing systems for implementing embodiments described herein.

FIG. 6 shows a system diagram that describes one implementation of computing systems for implementing embodiments described herein. In this example, system 600 includes head unit 104 and one or more other computing devices 650.

As described herein, head unit 104 is a computing device that can perform functionality described herein for monitoring audio signals or images of a user's mobile device for route information to determine an anticipated route that is used to select and provide associated content to a user. One or more special-purpose computing systems may be used to implement the head unit 104. Accordingly, various embodiments described herein may be implemented in software, hardware, firmware, or in some combination thereof. The head unit 104 includes memory 604, one or more processors 622, display 624, input/output (I/O) interfaces 626, other computer-readable media 628, network interface 630, and other components 632. The head unit 104 may also be in communication with a camera 110, a microphone 112, or both. The camera 110 or the microphone 112, or both, may be separate from or external to the head unit 104, as illustrated. In some embodiments, the camera 110, the microphone 112, or some combination thereof may be embedded in or otherwise incorporated in head unit 104, such as other components 632.

Processor 622 includes one or more processors that execute computer instructions to perform actions, including at least some embodiments described herein. In various embodiments, the processor 622 may include one or more central processing units (CPUs), programmable logic, or other processing circuitry.

Memory 604 may include one or more various types of non-volatile and/or volatile storage technologies. Examples of memory 604 include flash memory, hard disk drives, optical drives, solid-state drives, various types of random-access memory (RAM), various types of read-only memory (ROM), other computer-readable storage media (also referred to as processor-readable storage media), or other memory technologies, or any combination thereof. Memory 604 may be utilized to store information, including computer-readable instructions that are utilized by processor 622 to perform actions, including at least some embodiments described herein.

Memory 604 may have stored thereon various modules, such as automobile (or vehicle) monitoring module 608 and content presentation module 610. The automobile monitoring module 608 provides functionality to capture and analyze audio signals or images from the microphone 112 or camera 110, respectively, for route information, as described herein. The content presentation module 610 provides functionality to determine an anticipated route from the detected route information. In some embodiments, the content presentation module 610 requests associated content from another computing device, such as other computing devices 650, which may include remote server 124 in FIG. 1. In other embodiments, the content presentation module 610 itself selects the associated content. Once selected or received, the content presentation module 610 provides the content to the user, such as via display 624, other I/O interfaces 626, or other components 632.

Memory 604 may also store other programs 618 and other content 620. Other programs 618 may include operating systems, user applications, or other computer programs. Content 620 may include visual, audio, or tactile content to provide to the user, as described herein.

Display 624 is a display device capable of rendering content to a user. In various embodiments, the content selected by the content presentation module 610 is presented to the user via the display 624. The display 624 may be a liquid crystal display, light emitting diode, or other type of display device, and may include a touch sensitive screen capable of receiving inputs from a user's hand, stylus, or other object.

I/O interfaces 626 may include interfaces for various other input or output devices, such as audio interfaces, other video interfaces, tactile interface devices, USB interfaces, physical buttons, keyboards, or the like. In some embodiments, the I/O interfaces 626 provide functionality for the head unit 104 to communicate with the camera 110 or the microphone 112. In other embodiments, the I/O interfaces 626 provide functionality of the head unit 104 to output content via display devices, audio output devices, or haptic interface devices that are separate from the head unit 104, for providing visual, audible, or tactile content, respectively, to the user of the vehicle.

As an example, the camera 110 is a camera positioned and configured to capture images of a display screen of a user's mobile device 114 (not illustrated). The microphone 112 is a microphone positioned and configured to capture audio from within an interior of the vehicle 102 (not illustrated).

Other computer-readable media 628 may include other types of stationary or removable computer-readable media, such as removable flash drives, external hard drives, or the like. Network interfaces 630 are configured to communicate with other computing devices, such as the other computing devices 650, via a communication network 634. Network interfaces 630 include transmitters and receivers (not illustrated) to send and receive data as described herein. The communication network 634 may include the communication network 122 or the mobile device communication network 120 of FIG. 1.

The other computing devices 650 are computing devices that are remote from the head unit 104 or part of the vehicle 102 and in some embodiments, can perform functionality described herein for processing incoming data (such as audio or visual data) and delivering corresponding content to present to a user of the head unit 104. As explained earlier, the content presented may be based on an anticipated route. The other computing devices 650 may include remote server 124 or mobile device 114 in FIG. 1 or some other computer that is part of the vehicle 102.

One or more special-purpose computing systems may be used to implement the other computing devices 650. Accordingly, various embodiments described herein may be implemented in software, hardware, firmware, or in some combination thereof.

The other computing devices 650 include memory 654, one or more processors 662, display 664, I/O interfaces 666, and network interface 670, which may be similar to or incorporate embodiments of memory 604, processor 622, display 664, I/O interfaces 626 and network interface 670 of head unit 104, respectively. Thus, processor 662 includes one or more processors that execute computer instructions to perform actions, including at least some embodiments described herein. In various embodiments, the processor 622 may include one or more central processing units (CPUs), programmable logic, or other processing circuitry. Memory 654 may include one or more various types of non-volatile and/or volatile storage technologies. Memory 654 may be utilized to store information, including computer-readable instructions that are utilized by processor 662 to perform actions described herein. Memory 654 may also store programs 656 and content 658. The programs 656 may include a content selection module, not illustrated, similar to content presentation module 610 that selects and provides content to the head unit 104 based on information received from the head unit 104.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A system, comprising:
a memory configured to store data and computer instructions;
an output interface coupled to the memory, the output interface configured to present content to a user of a vehicle;
a GPS unit configured to receive information regarding a current location of the vehicle;
a microphone configured to capture audio from within the vehicle;
a camera configured to capture images of a display screen of a mobile computing device of the user; and
a processor configured to execute the computer instructions to:
receive audio data via at least one of either the microphone or an image via the camera or both;
analyze the received audio data or image or both to identify route information; and
in response to identification of the route information:
determine, via the GPS unit, a current location of the vehicle;
determine an anticipated route of the vehicle based on the current location of the vehicle and the route information;
receive content to present to the user of the vehicle based on the current location of the vehicle and the anticipated route of the vehicle; and
present the content to the user via the output interface.

2. The system of claim 1, wherein the received audio data is received from a voice of the user of the vehicle.

3. The system of claim 1, wherein the received audio data is received from a speaker of an electronic device providing audible driving directions to a driver of the vehicle.

4. The system of claim 1, wherein the processor is configured to analyze the received image by executing further computer instructions to:
perform image recognition on the received image to identify textual route information on the display screen of the mobile computing device; and
determine the textual route information from the identified textual route information.

5. The system of claim 1, wherein the route information includes a graphical map with a highlighted route.

6. The system of claim 1, wherein the route information includes a textual instruction for a driver of the vehicle.

7. The system of claim 1, wherein the processor is configured to analyze the received image by executing further computer instructions to:
perform image recognition on the received image to identify text on the display screen of the mobile computing device; and
compare the identified text with known data sets corresponding to characters; and
in response to a match between the identified text and the known data sets, identify the route information.

8. The system of claim 1, wherein the processor is configured to execute the computer instructions to further:
receive a plurality of location data for the vehicle based on the information regarding the current location of the vehicle received via the GPS unit during a time period;
generate a current route of the vehicle for the time period based on the plurality of location data;
select a previous route from a plurality of previous routes that includes a first segment that matches the current route and a second segment that matches the anticipated route;
select additional content based on the selected previous route without input or interaction from the user; and
present the additional content to the user via the output interface.

9. The system of claim 1, wherein the processor is configured to select the content by executing further computer instructions to:
select an advertisement for a store that is within a select proximity to the route information.

10. A method, comprising:
receiving indirect audible route information from within a vehicle;
receiving an estimated route of the vehicle based at least in part on the indirect audible route information;
receiving an image of a display screen of a mobile computing device of a person in the vehicle;
analyzing the received image to identify route information on the display screen of the mobile computing device;
determining visual route information commands from the route information;
updating the estimated route based on the visual route information;
receiving content to present to a user of the vehicle based on the updated estimated route of the vehicle; and
providing the content to the user.

11. The method of claim 10, wherein receiving the indirect audible route information includes:
receiving the indirect audible route information from a voice of a person within the vehicle.

12. The method of claim 10, wherein receiving the indirect audible route information includes:
receiving audio signals from an electronic speaker of an electronic device providing audible driving directions to a driver of the vehicle.

13. A computer device, comprising:
a memory that stores computer instructions; and
a processor that, when executing the computer instructions, causes the computer device to:
receiving indirect audible route information from within a vehicle;
identifying an estimated route of the vehicle based at least in part on the indirect audible route information;
identifying a current route of the vehicle;
selecting a previous route from a plurality of previous routes that includes a first segment that matches the estimated route and a second segment that matches the estimated route;
selecting content to present to a user of the vehicle based on the selected previous route without input or interaction from the user; and
providing the content to the user.

* * * * *